Figure 1:
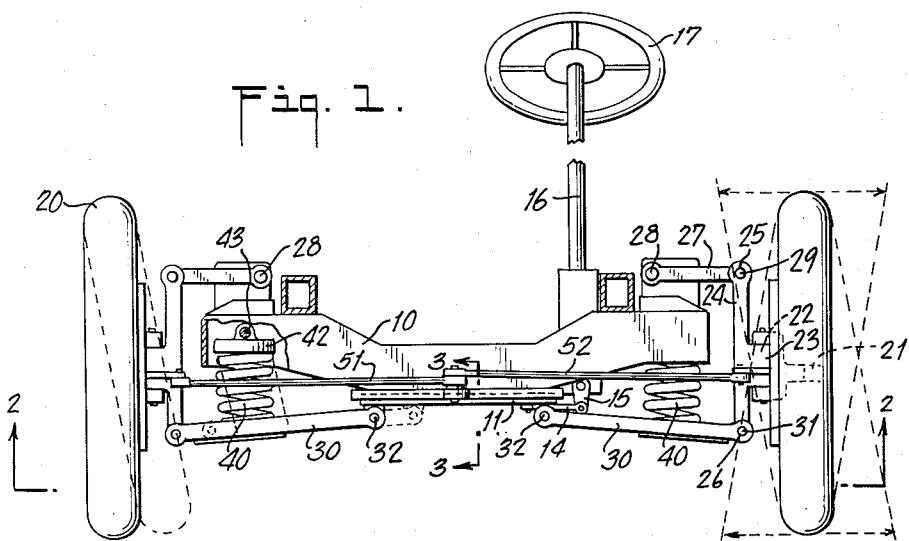

Sept. 16, 1958        E. JOHNSON        2,852,268

STEERING AND BANKING MECHANISM FOR A VEHICLE

Filed April 26, 1954

INVENTOR.
ELLIS JOHNSON
BY
ATTORNEY

United States Patent Office 2,852,268
Patented Sept. 16, 1958

2,852,268

STEERING AND BANKING MECHANISM FOR A VEHICLE

Ellis Johnson, Long Branch, N. J.

Application April 26, 1954, Serial No. 425,592

4 Claims. (Cl. 280—95)

This invention relates to an improvement in the steering mechanism of an automobile and more particularly to an apparatus for banking the front wheels of the vehicle when turning.

There are similar means of banking the front wheels of a vehicle shown in the prior art. In one instance the king pins or spindles on which the front wheels turn are inclined rearwardly and by means of a spiral mechanism on each spindle, the wheels may be inclined toward the direction in which they are turned while raising the inner end of one wheel axis and lowering the inner end of the other wheel axis. This operation is effected by the normal steering column and tie rod connection. The disadvantage of this arrangement is the manner of tilting the complete front axle so that the main forward thrust of the vehicle while turning is imposed upon the high side of the axle and in turn the one wheel adjacent to that side. The prior art also illustrates a front wheel banking apparatus in which the wheel steering knuckle and axle is shifted from a vertical to an inclined position. In this instance the king pin or wheel spindle is pivotally mounted at its upper end and mounted in a cam at its lower end so that turning of the wheel rotates the cam and due to its pivotal connection at the upper end tilts the wheel in or out as the case may be. This device is operated by the normal steering gear and tie rod connections found in the steering apparatus. The objectionable feature of this device is that the rotation of the lower cam produces a tilting action in a cup-shaped formation in the axle and produces greater stresses in the steering tie rods, that is, a greater force is required to produce the turn of the spindle and the cup-shaped portion increases the area for frictional wear. A further embodiment illustrated in the prior art is the mounting of each wheel to a spindle that is provided with a worm gear above and below the axle mounting. In this instance the spindles are rearwardly inclined and the normal operation of the steering gear in turning the wheel spindle affects a dropping of the inner end of the axle, that is, the end of the axle toward which the vehicle is turned. It is apparent that although the vehicle is mounted by two spring supports at either end of the axle only one end of the axle is dropped and again due to the normal centrifugal force exerted by the vehicle under speed, the majority of the force will be exerted on the higher end of the axle toward the outer wheel. Thus this arrangement does not disperse the force over both wheels during a turning operation. It is to be noted in the prior art that in order to produce a banking effect of the front wheels of the vehicle in each instance the king pin or wheel spindle is raised or tilted.

It is an object of this invention to provide the banking of the front wheels of a vehicle and at the same time the turning of the vehicle wheels by producing a shifting of the main frame of the motor vehicle with relation to an auxiliary plate which in turn affects the axial relationship of the wheels to the motor vehicle.

A further object of this invention is to provide an apparatus that is affixed to the front of the frame of a motor vehicle to produce the desired turning of the motor vehicle wheels and at the same time effects a change in their angular relation to the frame to produce a banking effect without changing the normal horizontal position of the vehicle frame.

A still further object of this invention is to support each front wheel of a motor vehicle between an upper A frame and a lower A frame and in which the upper A frame is pivotally attached at a fixed position to the main frame while the lower A is pivotally attached to an auxiliary plate and in which the auxiliary plate is shiftable to the right or left with relation to the main frame to thus produce a shifting of both wheels to a banked position for a turn in either direction.

A still further object of this invention is to pivotally support each front wheel of a motor vehicle between an upper A frame and a lower A frame and in which the upper A frame is pivotally attached at a fixed position while the lower A frame is pivotally attached to an auxiliary plate and at the same time the pivotally supported axle of each wheel is provided with an extension arm to effect the turning of the axle and in which a tie rod is pivotally mounted to the outer end of the extension and at its opposite end pivotally mounted to a fixed point connected to said frame and in which the auxiliary plate is shiftable to the right or left with relation to the frame to thus produce a shifting of both wheels to a banked position while also producing a turning of each axle toward the right or left as the case may be.

A still further object of this invention is to support each front wheel of a motor vehicle between an upper A frame and a lower A frame and in which the upper A frame is pivotally attached at a fixed position while the lower A frame is pivotally attached to an auxiliary plate and in which a supporting resilient element is mounted between the main frame and the lower A frame and further in which said resilient element is pivotally mounted at its upper end to said main frame and in which the auxiliary plate is shiftable to the right or left with relation to the frame to thus produce a shifting of both wheels to a banked position for a turn in either direction while maintaining an equal resilient support at either end of said main frame.

Figure 2:
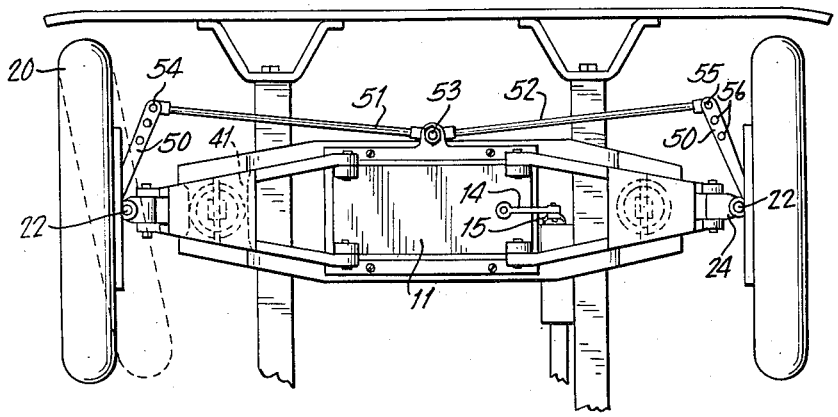
Figure 3:
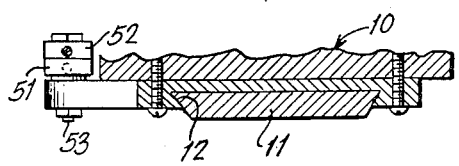

Various other objects shall be apparent by reference to the accompanying detailed description and the drawings in which Fig. 1 illustrates a front elevational view of the supporting frame work and steering mechanism of a motor vehicle, Fig. 2 is a bottom plan view taken on line 2—2 of Fig. 1, and Fig. 3 is a cross sectional detail taken on line 3—3 of Fig. 1.

Referring to the drawings and namely Figs. 1 and 2 there is illustrated a full floating front end, that is, in the present construction of a motor vehicle in which an upper and lower A frame are provided for the mounting of a wheel the wheel is referred to as mounted in a floating position. In this invention due to the moveable relationship between the steering mechanism and the frame of the motor vehicle, the complete front end is truly mounted in a fully floating position. This becomes more apparent by referring to the details of construction in which a main frame 10 supports the vehicle (not shown) while an auxiliary plate 11 is slideably affixed in a transverse position to the under side of the front end of the frame 10. Referring to Fig. 3 it is apparent that plate 11 may be affixed in various manners to attain the result desired. However Fig. 3 illustrates plate 11 as mounted in a keyway 12 in which the keyway is cut with an acute angle on either side thereof. Plate 11 is formed to fit into the acute angle of the keyway to retain plate 11 in its keyway yet permit the reciprocal movement in either direction within the keyway. Plate 11 may be attached by means of an arm 14 to a bell crank lever 15 that is connected to the end of the steering column 16. Thus with the turning of a steering wheel 17 in either direction, counter-clockwise or clockwise, bell crank lever 15 will be moved to the left or right which in turn by means of arm 14, will push or pull plate 11 within its keyway 12 as desired. The degree of movement desired for plate 11 may be governed by increasing or decreasing the length of the bell crank lever 15. In a practical installation, the maximum degree of movement of plate 11 should be about six inches from its central position to the right or to the left. With this apparatus each front wheel 20 is mounted in the normal fashion by means of an axle 21 and a king pin 22 to be pivotally supported on either side of the motor vehicle. However in this particular embodiment the vertical hub 23 through which the king pin 22 is mounted to retain the wheel 20 in a pivotally supported position is a part of a vertically positioned frame 24. Frame 24 is provided with a pivotal connection at either end thereof. In this instance the frame 24 provides a bore 25 at the upper end and a bore 26 at the lower end. An A frame 27 is pivotally affixed at 28 to the upper side of the main frame 10. The opposite end of the A frame 27 is pivotally affixed by a pin 29 that is in turn mounted in the bore 25 of the frame 24. A lower A frame 30 is similarly affixed at the wheel end by means of a pin 31 mounted in the bore 26 of frame 24. The opposite end of A frame 30 is pivotally affixed at 32 to the lower side of plate 11. In order that the frame 10 may be supported by this type of construction, at either side thereof a coil spring 40 is mounted between the lower side of frame 10 and the upper side of the A frame 30. Rather than mount the spring 40 loosely between elements the lower end of coil spring 40 may be affixed to a plate or the central cross element 41 of the A frame 30. While the upper end of spring 40 may be mounted in a pivotally mounted socket 42, the socket 42 being pivotally mounted on a rod 43, the rod 43 is affixed to the frame 10. Thus it is apparent that springs 40 will retain the weight of the frame 10 distributed evenly on the two lower A frames 30. Further, due to the ability to shift plate 11 with relation to the frame 10, springs 40 may be deflected to the left or right and thus permit the pivotal movement of the springs with relation to their mounting 43 and thus retain an equal distribution of the weight and provide the means to maintain frame 10 in a level position or a nearly level position at all times. Referring to Fig. 2 it is to be noted that each frame 24 is provided with an extended arm 50 that is integral with frame 24 and pivotally moveable with frame 24. A pair of tie rods 51 and 52 are provided. The tie rods at one end thereof are pivotally connected at a fixed point 53 to the frame 10. Tie rod 51 is in turn pivotally affixed by a pin 54 to the outer end of the extended arm 50 while tie rod 52 is pivotally affixed by a pin 55 to the outer end of the extended arm 50 in the opposite wheel. It is to be noted that the extended arms 50 are provided with a plurality of apertures 56 so that the pivotal pins 54 and 55 may be used to connect tie rods 51 and 52 at any one of a plurality of positions. This is provided so that the rods may be moved to any one of these positions, of course both rods being mounted in the same corresponding aperture. In operation the lesser degree of rotative movement of wheel 20 is produced when the pins 54 and 55 are mounted in the position illustrated in Fig. 2. If a greater degree of rotation is desired, pins 54 and 55 must be moved down closer to the king pin 22 which is the center of rotation of wheel 20.

Referring to Figs. 1 and 2 the operation of the device is really quite simple. Although the normal steering of a vehicle with the steering wheel is to effect a pivotal movement of the front wheels with relation to the normal central axis of the vehicle. In this particular invention the operation of the steering wheel produces a dual function. Instead of connecting the steering wheel and column to its linkage directly to the wheels, it is connected to an auxiliary plate 11 that is slideably positioned and affixed to the frame of the vehicle in a transverse position. With the rotation of the steering wheel clockwise or counter-clockwise, this motion is translated to plate 11 to move it to the left or right with relation to frame 10. It is to be remembered that as already described each wheel 20 is supported by an upper and lower A frame. With the upper A frame pivotally retained in a fixed position while the lower A frame is pivotally attached to the auxiliary plate 11, the movement of plate 11 to the left or right will in turn shift the position of the lower A frames with relation to the upper A frames. This shifting of the position of plate 11 in turn produces a pivotal movement of the wheel supporting frame 24, that is, the wheel 20 will be pushed outward in one instance or pulled inward as illustrated in dotted lines on the left wheel of Fig. 1. Of course since both wheels are connected to the plate 11 when the left wheel takes the dotted position illustrated in Fig. 1, the right wheel will assume a parallel position on the opposite side of the vehicle. This in effect produces a banking of the two wheels for a normal turn to the right with the vehicle and vice versa with a turn to the left the wheels 20 will be banked in an opposite position. It is also apparent that during the movement of plate 11 with respect to frame 10, there is no raising or lowering of frame 10. Rather, the frame is simply shifted on a level plane with relation to the steering and banking apparatus. However due to the shifting of the center of gravity toward the left or right depending on the direction of turn, the weight of the vehicle will be shifted to lead one spring more than the other. This will in turn produce a banking effect on the vehicle and the vehicle will lean in the direction in which it is turned. The degree of bank depends upon the speed and sharpness of the turn. To insure the equal distribution of the weight by the supporting elements (springs 40) the supporting elements have a pivotal mounting at 43 so that the springs 40 act in their normal fashion without distortion. In order to insure a perfect action of spring 40, the lower end of spring 40 may also be pivotally affixed to the cross member of the lower A frame if desired. In the embodiment illustrated the lower portion of spring 40 is mounted in a socket permitting a reasonable degree of movement of the base of spring 40. It is also apparent that with wheels 20 pivotally mounted by the king pins 22 and connected by means of their extension arms 50 and tie rods 51 and 52 to a fixed point 53 that when plate 11 is shifted to the left or right, the position of the king pins 22 will likewise be shifted to the left or right on a central axis running through the center of plate 11. The movement of king pins 22 will necessarily effect a turning of the wheels 20 due to the connection with a stationary point 53. As king pin 22 on the left hand wheel, Fig. 2, moves outward wheel 20 will turn inward, and vice versa when king pin 22 moves to the right or inward wheel 20 will resume its straight position and if moved further will be carried to a position as illustrated in dotted lines. The longer the extension arm 50 is or rather the further the pivotal element 54 is mounted from king pin 22 the less the effect the motion of plate 11 will have on the turning of wheel 20. Of course if pin 54 is moved inward close to pin 22 the movement of plate 11 due to a shorter attachment due to a shorter pivotal point, it will produce a greater degree of turning of wheel 20. It is therefore apparent that when wheel 17 is turned to the left or right, wheels 20 will be both banked and turned in the one operation.

It is also to be noted that the sliding plate 11 will cause one spring 40 to be pulled closer to the center of weight and pushes the other spring 40 away from the weight of the center causing it to act as an upright brace when it expands. This would tend to hold the vehicle up on the outer side of a turn and compressing the spring on the inner side of a turn. This would cause the vehicle to lean in the direction in which the turn is made. This tends to maintain a perfect balance of the frame during a turn. This is one of the most important points of the improvement in this construction, namely, retaining this balance and proper banking making it practically impossible to overturn the vehicle due to centrifugal force. It is further apparent that actually the driver of the vehicle when moving the steering wheel 17 effects a shifting of the frame 10 toward the direction in which he wishes to turn the vehicle. This produces a shifting of the center of gravity toward the direction in which the vehicle is to be turned which assists in a better distribution of the forces tending to lessen the natural centrifugal force which normally produces the majority of the force against the outer wheel during a turn. There are other advantages to be considered in the banking of the wheels, namely, the better distribution of the force to the surface of the tires and minimizing the shearing force across the tire during a turn. A further advantage to this type of construction is the rigidity provided for both wheels by limiting the turning arc of the wheels with a fixed point attached to the main frame. This requires a minimum linkage and thus minimizes the looseness or play that may develop due to linkage.

It is to be understood that although the front wheels of the vehicle as illustrated are in a perfectly vertical position, the wheels may be toed in to a degree to provide a better gripping or control of the vehicle as is the common practice of vehicles now without departing from the spirit of this invention. Likewise the camber of the wheel may be adjusted as desired without departing from the spirit of this invention. Although this invention discloses a shiftable plate 11, any linkage such as a hydraulic cylinder, may be used to produce a power stroke, or any rod, or direction connection may be utilized to produce the same result upon both lower A frames without departing from the spirit of this invention and this invention shall be limited only by the appended claims.

What is claimed is:

1. In a vehicle front wheel banking apparatus, a main frame, a pair of front wheels, an auxiliary plate mounted for lateral sliding movement on the front end of said main frame, each of said front wheels being mounted on and supported by a vertically positioned frame that is pivotally attached at its respective ends to upper and lower A frames, said upper A frames being pivotally attached at a fixed position to the main frame and said lower A frames being pivotally attached to opposite ends of the auxiliary plate, a resilient element mounted between each lower A frame and the main frame of the vehicle, a steering column for said vehicle, the end of said steering column being provided with a crank arm, said crank arm being connected by a bar to said auxiliary plate, each vertically positioned wheel supporting frame being provided with a forwardly extending arm, a pair of tie rods, one end of each tie rod being pivotally connected to a central fixed point on the main frame of the vehicle, the opposite end of each of said tie rods being pivotally connected one to each forwardly extending arm of said vertically positioned frames, means to move said auxiliary plate a predetermined degree to either side of the central axis of the main frame with the steering column.

2. In a device according to claim 1 in which said forwardly extending arms of said vertically positioned wheel supporting frames are provided with means to vary the distance from the center of the wheels to the pivotal mounting of each tie rod and in such a manner that the distances at the respective wheels may be made equal.

3. A steering mechanism for a vehicle comprising a main frame, a pair of front wheels, said front wheels being mounted between upper and lower A frames an auxiliary plate mounted under the front end of said main frame for lateral sliding movement said pair of front wheels each pivotally mounted to a vertically positioned wheel supporting frame, a pair of upper A frames pivotally attached at a fixed position to opposite sides of the main frame and a pair of lower A frames pivotally attached to opposite ends of the auxiliary plate, a resilient element mounted between each lower A frame and the main frame of the vehicle, each wheel supporting frame being pivotally mounted between an upper A frame and a lower A frame each vertically positioned wheel supporting frame is provided with a forwardly extending arm, a pair of tie rods, each tie rod pivotally connected at one of its ends to a central fixed point on the main frame of the vehicle, the opposite end of each of said tie rods being pivotally connected one to each forwardly extending arm of said vertically positioned frame, a steering connection to said auxiliary plate for moving said plate a predetermined degree to either side of the central axis of the main frame when steering said vehicle.

4. In a device according in claim 3 in which the degree of inclination of the front wheels for banking shall be regulated by the degree to which the auxiliary plate may be moved from a central position toward either side and in which the degree of pivotal steering movement of each wheel may be similarly governed by the degree of movement of said auxiliary plate.

References Cited in the file of this patent

UNITED STATES PATENTS

| | | |
|---|---|---|
| 775,271 | Graham | Nov. 15, 1904 |
| 2,652,263 | Varnum | Sept. 15, 1953 |